United States Patent [19]

Söderström

[11] 4,219,428
[45] Aug. 26, 1980

[54] WATER RESERVOIR

[76] Inventor: Gert Söderström, Hammarbyvägen 62, Upplands Väsby, Sweden, S-194 00

[21] Appl. No.: 957,053

[22] Filed: Nov. 3, 1978

[30] Foreign Application Priority Data

Nov. 3, 1977 [SE] Sweden .................................. 7712460

[51] Int. Cl.² ............................................. B01D 21/10
[52] U.S. Cl. .................................. 210/522; 210/532 R
[58] Field of Search ................ 210/532 R, 532 S, 536, 210/537, 538, 540, 521, 522

[56] References Cited

U.S. PATENT DOCUMENTS 1,750,922  3/1930  Cheakas et al. ..................... 210/537

Primary Examiner—Frank Sever
Attorney, Agent, or Firm—Schuyler, Birch, McKie & Beckett

[57] ABSTRACT

A water collection device is disclosed which provides a source of usable water from collected surface and waste water, and comprises three concentrically arranged compartments which function as a septic tank. The innermost compartment performs a settling function and delivers clarified water through a liquid seal to the intermediate compartment, from which it is drawn for use. Excess water in the intermediate compartment overflows into the outermost compartment, from which it is discharged as waste.

8 Claims, 1 Drawing Figure

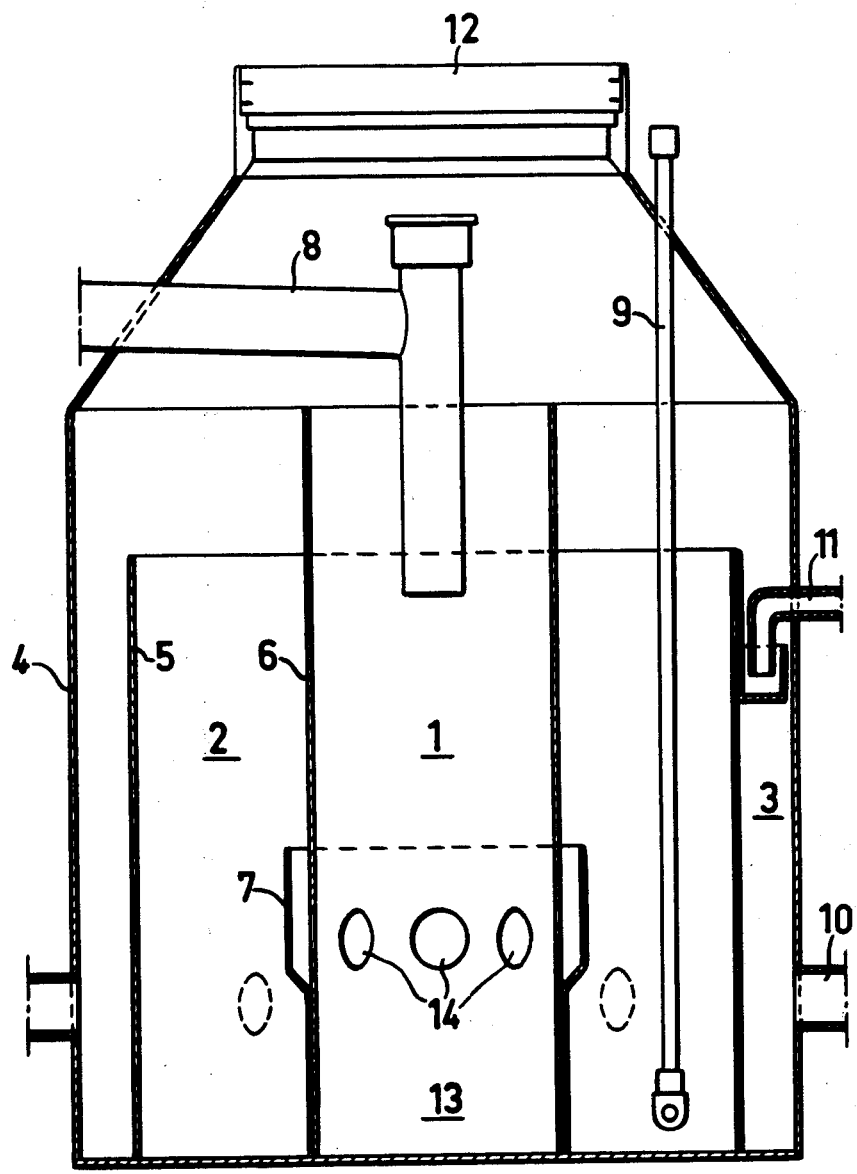

WATER RESERVOIR

This invention relates to a collection vessel for surface water and optionally domestic waste water for subsequent use in watering, car washing and the like via a pump or hydrophore installation. The need of an installation of this type has gradually increased in recent years as a consequence of decreasing water supplies accompanied by watering restrictions in many municipalities. It is thus the object of the invention to gather up the amounts of water that can still be utilized but which otherwise would be lost, often without even being of use in subsoil water.

In order to eliminate this unsatisfactory state of things the invention relates in principle to a three-compartment septic tank, the second compartment of which is utilized as an actual water supply, while the first compartment is utilized for fat and sludge separation and the last compartment to drain excess amounts of water either to a sewage disposal system or an infiltration system, a suction pipe being immersed in the second compartment.

More immediate advantages and characteristics of the invention appear better from the description given below of an illustrative example in connection with the drawing, which is an elevational view, in section, of the collection vessel of the invention.

The collection vessel shown in the drawing comprises a first compartment 1, in which an inlet 8 for surface water and possibly domestic waste water ends well below the upper edge of this first upwardly open compartment 1. The first compartment 1 comprises a sludge room 13 at its bottom, above which outlets 14 arranged in the wall of the compartment carry off the water to the second compartment 2 of the collection vessel. However, these apertures 14 are surrounded by a mantle 7 projecting above the upper edges of the apertures 14 and connected at the bottom to a wall 6 of the first compartment 1 so that a water seal is formed, which insures that water is always left in and immediately above the sludge room 13 to guarantee a good purification of the water flowing to the second compartment 2. The second compartment 2, i.e. the actual water supply, comprises a cylindrical outer wall 5 which concentrically surrounds the first compartment 1. Like the first compartment 1 the water reservoir 2 is upwardly open, and the edge of the wall 5 is lower than the wall 6 of the first compartment and defines in this way the highest water level that can appear in the water reservoir 2 as well as in the first compartment 1. In this way a pit is formed in the first compartment 1 above this level for foam formation and fat separation.

In the water reservoir 2 a suction pipe 9 with bottom valve is arranged to suck water, if desired, by means of a hydrophore or pump means not shown in detail. If the water consumption is not enough to take charge of all the water given off to the water reservoir 2, excess water will run over the outer wall 5 of the reservoir and out into the third compartment 3 which surrounds the water reservoir 2 concentrically and forms a narrow annular gap therewith. The outer wall 4 of the last and outermost compartment is, moreover, the outer wall of the entire collection vessel, which becomes narrower upwards and is provided at the top with an inspection and cleaning opening 12, which is closed by a door. In the outer wall of the third compartment connections 10 are arranged near to the bottom for possibly connecting infiltration lines. Above these infiltration connections but below the overflow level of the water reservoir 2, i.e. the upper edge of the outer wall 5 thereof, a drain connection 11 provided with a water seal or trap is arranged to drain the water to an ordinary sewage disposal system as the infiltration conduits cannot swallow all the water overflowing from the reservoir 2.

Thus, insures by this arrangement and that all the water supplied is utilized, either for watering, car washing and the like or for improving the level of the subsoil water. The device can preferably be made of plastic and, as an example, the size of the water reservoir may be 500-10000 l.

It is very well possible within the scope of the invention, to let the third compartment be an upright pipe in the second compartment to save material, especially as the water pressure to a certain extent can aid in balancing the surrounding earth pressure.

What is claimed is:

1. A water collection device for collecting surface water and/or waste water from various sources to provide a usable supply of water comprising:
    a first compartment;
    a water inlet to said first compartment;
    a second compartment for retaining a usable supply of water;
    water seal means interconnecting said first and second compartments for directing water from said first compartment to said second compartment and maintaining a water seal therebetween irrespective of the water levels in said first and second compartments; said second compartment comprising a continuous upstanding wall which is imperforate at least from its bottom to the uppermost level of said water seal means;
    a suction pipe immersed in the water in said second compartment for removing usable water therefrom;
    a third compartment;
    excess water transferring means located at the upper portion of said second compartment for transferring excess usable water from said second compartment to said third compartment; and
    drain means for removing said excess water from said third compartment.

2. A water collection device according to claim 1 wherein said second compartment is open at its top, and said excess water transferring means comprises an upper overflow edge of said second compartment.

3. A water collection device according to claim 2 wherein said first compartment is open at its top, is in free communication with the open top of said second compartment, and extends above the overflow edge of said second compartment, so that foam which may form in said first compartment is prevented from overflowing into said second compartment.

4. A water collection device according to claim 3 wherein said first compartment is contained within said second compartment and said third compartment surrounds said second and first compartments.

5. A water collection device according to claim 4 wherein said compartments are substantially concentric cylinders.

6. A water collection device according to claim 5 wherein said water seal means comprises a plurality of apertures in the wall of said first compartment, and a mantle surrounding said apertures and sealed at its lower end to said wall to define an upwardly opening water-retaining trough having an upper edge disposed above said apertures and below the overflow edge of said second compartment.

7. A water collection device according to claim 6 wherein said drain means comprises an overflow opening in the wall of said third compartment disposed below the overflow edge of said second compartment, and a trap connected to said overflow opening.

8. A water collection device according to claim 2 wherein said water inlet comprises an inlet pipe extending downwardly into said first compartment to a level below the overflow edge of said second compartment.

* * * * *